United States Patent
Shih et al.

(10) Patent No.: US 10,627,309 B1
(45) Date of Patent: Apr. 21, 2020

(54) MICRO-DISTANCE LENS DETECTION DEVICE

(71) Applicant: NEWMAX TECHNOLOGY CO., LTD., Taichung (TW)

(72) Inventors: Wei-Chun Shih, Taichung (TW); Yi-Huan Chu, Taichung (TW); Tsung-Chien Chiang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 16/231,955

(22) Filed: Dec. 25, 2018

(51) Int. Cl.
*G01M 11/02* (2006.01)
(52) U.S. Cl.
CPC ................. *G01M 11/0292* (2013.01)
(58) Field of Classification Search
CPC .................................................. G01M 11/0292
USPC .................................................. 356/124–137
See application file for complete search history.

(56) References Cited

U.S. PATENT DOCUMENTS

| 4,641,962 | A | * | 2/1987 | Sueda | G01M 11/0264 356/124 |
| 5,198,867 | A | * | 3/1993 | Campbell | G01B 11/255 356/125 |
| 5,847,822 | A | * | 12/1998 | Sugiura | G01N 21/88 356/239.2 |

* cited by examiner

*Primary Examiner* — Tri T Ton
(74) *Attorney, Agent, or Firm* — Bruce Stone LLP; Joseph A. Bruce

(57) ABSTRACT

Provided is a micro-distance lens detection device adapted to detect a tested lens with a surface from a micro distance. The micro-distance lens detection device includes a light source module, a diffuser, a pattern test card, a collimator unit and an image pickup module which are arranged sequentially. The tested lens is disposed between the pattern test card and the collimator unit. The surface of the tested lens is separated from the light-emitting side of the pattern test card by the micro distance. The micro distance is less than 25 mm. Given the micro distance between the tested lens and the pattern test card, the optical resolution modulation transfer function (MTF) of the tested lens is correctly measured. Therefore, the lens detection device takes up little space.

8 Claims, 3 Drawing Sheets

MICRO-DISTANCE LENS DETECTION DEVICE

BACKGROUND

1. Technical Field

The present disclosure relates to lens-equipped detection devices and, more particularly, to a micro-distance lens detection device.

2. Description of Related Art

Conventional lenses are widely applied to portable mobile devices, such as smartphones and digital cameras. However, the quality of the lenses depends on their manufacturing process. Hence, prior to their delivery, the lenses manufactured must undergo a detection procedure to ensure that they will meet design requirements. For instance, optical resolution modulation transfer function (MTF) has become a common, commercial indicator of the optical quality of a lens.

Referring to FIG. 1, a conventional lens detection device essentially comprises a light source module 11, a pattern test card 12 and an image pickup module 13. Light emitted from the light source module 11 passes through the pattern test card 12 to provide a test pattern required for a tested lens 14. The tested lens 14 is placed at a test position. An image formed from the test pattern by the tested lens 14 is captured by the image pickup module 13 and sent to a host computer 15. Then, the host computer 15 analyzes the image captured.

Given the conjugate ratio of object distance to image distance, the longer the object distance, the shorter the image distance, and vice versa. Therefore, the lens detection device can detect the object distance (i.e., the distance between the tested lens 14 and the pattern test card 12) only within a specific range, that is, around 320 mm to 500 mm. If the distance between the tested lens 14 and the pattern test card 12 is less than the aforesaid range, especially if the object distance (i.e., the distance between the tested lens 14 and the pattern test card 12) is less than 25 mm, the image pickup module 13 must be located at an infinite distance from the tested lens 13, and thus the need for equipment space is maximized to the detriment of the detection device.

BRIEF SUMMARY OF THE INVENTION

It is an objective of the present disclosure to provide a micro-distance lens detection device capable of detecting a tested lens from a micro distance, as the lens detection device needs just a small space.

In order to achieve the above and other objectives, the present disclosure provides a micro-distance lens detection device adapted to detect a tested lens with a surface from a micro distance. The micro-distance lens detection device comprises a light source module, a diffuser, a pattern test card, a collimator unit and an image pickup module.

The light source module provides a light beam. The diffuser is disposed at a path of the light beam to homogenize the light beam passing. The pattern test card is disposed at a path of the light beam homogenized. The pattern test card has a light-emitting side and generates a test pattern light form required for the tested lens according to the light beam. The tested lens is disposed between the pattern test card and the collimator unit. The surface of the tested lens is separated from the light-emitting side of the pattern test card by the micro distance. The surface faces the light-emitting side. The micro distance is less than 25 mm. The collimator unit receives the test pattern light form having passed through the tested lens and then focus the test pattern light form on the image pickup module.

The advantages of the present disclosure are described below. The light source module, diffuser, pattern test card, collimator unit and image pickup module, which are arranged sequentially, allow the optical resolution modulation transfer function (MTF) of the tested lens to be measured at the micro distance from the pattern test card. Therefore, the lens detection device takes up little space. Given the micro distance between the tested lens and the pattern test card, the MTF of the tested lens is correctly measured at both on-axis point and off-axis point. The MTF of the tested lens can be measured, regardless of whether its focal plane is inside the lens barrel or outside the lens barrel.

Preferably, the tested lens has a lens barrel and a lens assembly disposed in the lens barrel. The lens assembly generates a focal plane. The focal plane is inside the lens barrel or outside the lens barrel.

Preferably, the micro distance is less than 10 mm.

Preferably, a test pattern form of the pattern test card is a bar chart, an edge chart or a slit chart.

Preferably, the collimator unit comprises an image pickup lens and a collimator. The image pickup lens receives the test pattern light form having passed through the tested lens. The collimator receives the test pattern light form having passed through the image pickup lens and focuses the test pattern light form on the image pickup module.

In order to achieve the above and other objectives, the present disclosure provides a micro-distance lens detection device adapted to detect a tested lens with a surface from a micro distance. The micro-distance lens detection device comprises a light source module, a filter, a pattern test card, a collimator unit and an image pickup module.

The light source module provides a light beam. The filter is disposed at a path of the light beam to filter out specific wavelength components of the light beam. The pattern test card is disposed at a path of the light beam filtered. The pattern test card has a light-emitting side and generates a test pattern light form required for the tested lens according to the light beam. The tested lens is disposed between the pattern test card and the collimator unit. The surface of the tested lens is separated from the light-emitting side of the pattern test card by the micro distance. The surface faces the light-emitting side. The micro distance is less than 25 mm. The collimator unit receives the test pattern light form having passed through the tested lens and then focus the test pattern light form on the image pickup module.

The advantages of the present disclosure are described below. The light source module, filter, pattern test card, collimator unit and image pickup module, which are arranged sequentially, allow the optical resolution modulation transfer function (MTF) of the tested lens to be measured at the micro distance from the pattern test card. Therefore, the lens detection device takes up little space. Given the micro distance between the tested lens and the pattern test card, the MTF of the tested lens is correctly measured at both on-axis point and off-axis point. The MTF of the tested lens can be measured, regardless of whether its focal plane is inside the lens barrel or outside the lens barrel.

Preferably, the tested lens has a lens barrel and a lens assembly disposed in the lens barrel. The lens assembly generates a focal plane. The focal plane is inside the lens barrel or outside the lens barrel.

Preferably, the micro distance is less than 10 mm.

Preferably, a test pattern form of the pattern test card is a bar chart, an edge chart or a slit chart.

Preferably, the collimator unit comprises an image pickup lens and a collimator. The image pickup lens receives the test pattern light form having passed through the tested lens. The collimator receives the test pattern light form having passed through the image pickup lens and focuses the test pattern light form on the image pickup module.

DETAILED DESCRIPTION OF THE INVENTION

Figure 1:
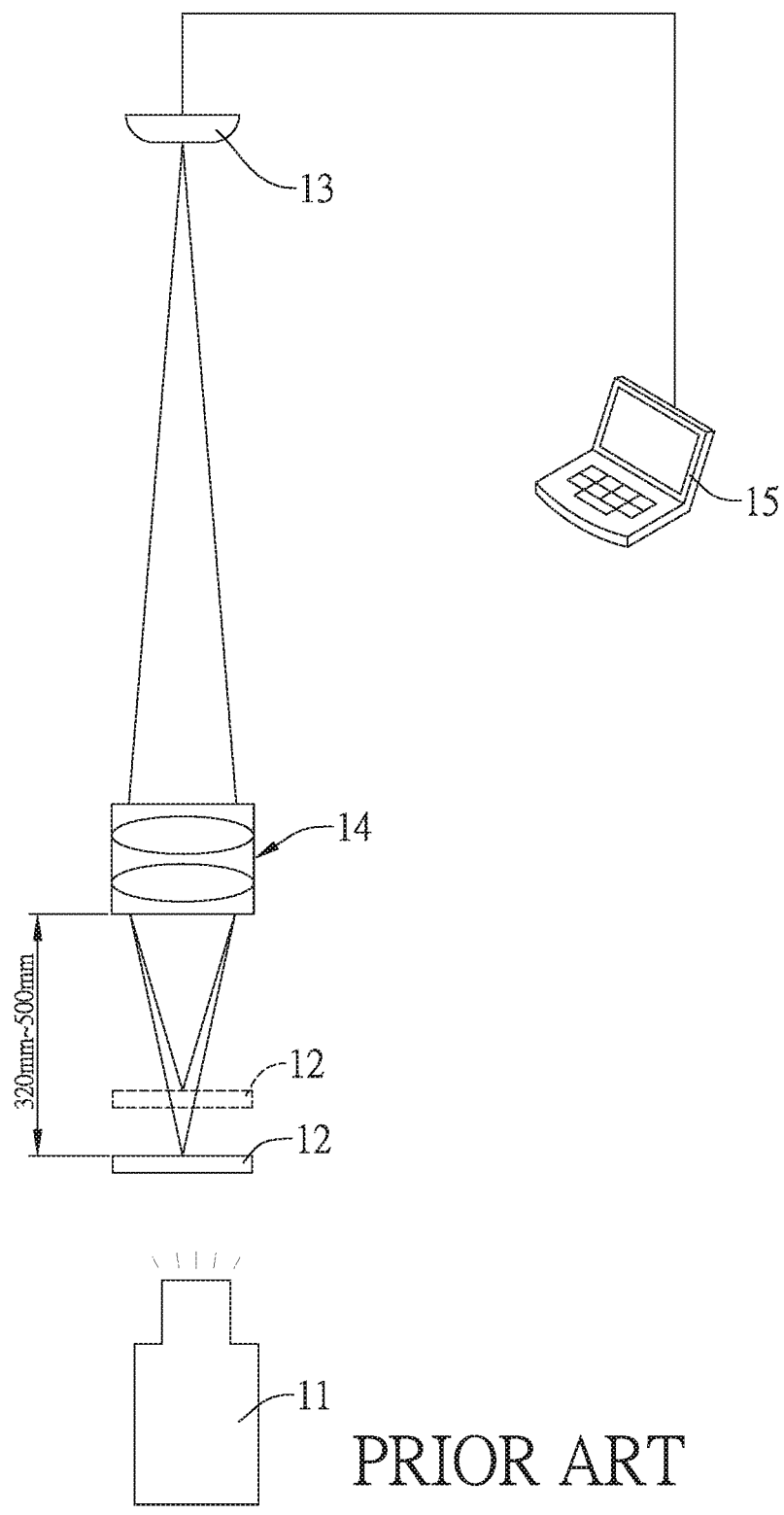
FIG. 1 (PRIOR ART) is a schematic view of a conventional lens detection device.
Figure 2:
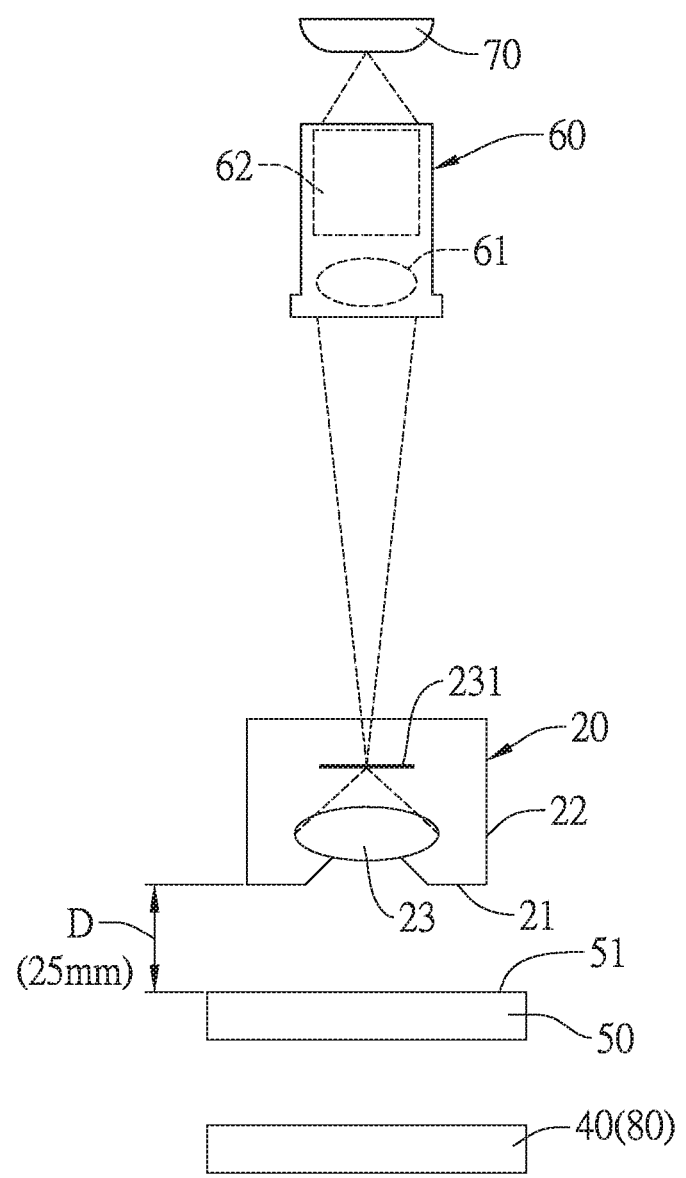
FIG. 2 is a schematic view of the first embodiment of the present disclosure.
Figure 2:
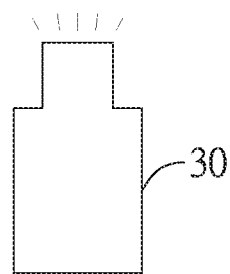

Referring to FIG. 2, a micro-distance lens detection device provided in the first embodiment of the present disclosure is adapted to detect a tested lens 20 with a surface 21 from a micro distance D. The micro-distance lens detection device comprises a light source module 30, a diffuser 40, a pattern test card 50, a collimator unit 60 and an image pickup module 70.

The light source module 30 provides a light beam.

The diffuser 40 is disposed above the light source module 30 and at a path of the light beam to homogenize the light beam passing. Hence, after passing through the diffuser 40, the light beam emitted from the light source module 30 is homogenized, thereby increasing the precision of the final measurement.

The pattern test card 50 is disposed above the diffuser and at a path of the light beam homogenized. The pattern test card 50 has a light-emitting side 51 and generates a test pattern light form required for the tested lens 20 according to the light beam. In this embodiment, a test pattern form of the pattern test card 50 is a bar chart, but the present disclosure is not limited thereto; hence, the test pattern form of the pattern test card 50 may also be an edge chart or a slit chart. The test pattern light form of the pattern test card 50 varies with the optical characteristics of the tested lens 20 to be tested. The pattern test card 50 may also be provided in the form of optical gratings.

The tested lens 20 is disposed between the pattern test card 50 and the collimator unit 60. The surface 21 of the tested lens 20 is separated from the light-emitting side 51 of the pattern test card 50 by the micro distance D, with the surface 21 facing the light-emitting side 51, and the micro distance D is 25 mm, but the present disclosure is not limited thereto. Hence, the micro distance D may also be less than 25 mm, for example, less than 10 mm (say, 5 mm, 6 mm, 7 mm, 8 mm, and 9 mm). In this embodiment, the tested lens 20 has a lens barrel 22 and a lens assembly 23 disposed in the lens barrel 22. The lens assembly 23 comprises a plurality of lenses and generates a focal plane 231. The focal plane 231 is inside the lens barrel 22.

The collimator unit 60 is disposed above the pattern test card 50 but below the image pickup module 70 to receive the test pattern light form having passed through the tested lens 20 and then focus the test pattern light form on the image pickup module 70. In this embodiment, the collimator unit 60 comprises an image pickup lens 61 and a collimator 62. The image pickup lens 61 receives the test pattern light form having passed through the tested lens 20. The collimator 62 receives the test pattern light form having passed through the image pickup lens 61 and then focuses the test pattern light form on the image pickup module 70. The collimator 62 simulates an infinite distance between the tested lens 20 and the image pickup module 70.

The image pickup module 70 receives the test pattern light form focused by the collimator unit 60.

The light source module 30, diffuser 40, pattern test card 50, collimator unit 60 and image pickup module 70, which are arranged in the aforesaid sequence, allow the optical resolution modulation transfer function (MTF) of the tested lens 20 to be measured at the micro distance D from the pattern test card 50. Therefore, the lens detection device takes up little space. The surface 21 of the tested lens 20 is separated from the light-emitting side 51 of the pattern test card 50 by the micro distance D of 25 mm. Therefore, after passing through the tested lens 20, the test pattern light form generated by the pattern test card 50 falls on corresponding focuses (i.e., the focal plane 231) of the tested lens 20. According to the present disclosure, the collimator unit 60 receives and projects the test pattern light form (i.e., images formed) having passed through the tested lens 20 to the image pickup module 70, so as to simulate an infinite distance between the tested lens 20 and the image pickup module 70. Finally, the image pickup module 70 is coupled to a host computer (not shown). After receiving the test pattern light form images, the host computer calculates the corresponding optical feature values, such as MTF, using the images.

Given the micro distance D between the tested lens 20 and the pattern test card 50, the MTF of the tested lens 20 is correctly measured at both on-axis point and off-axis point. The on-axis point is the center of the image of the image pickup module 70. The off-axis point is another point on the image of the image pickup module 70.

Figure 3:
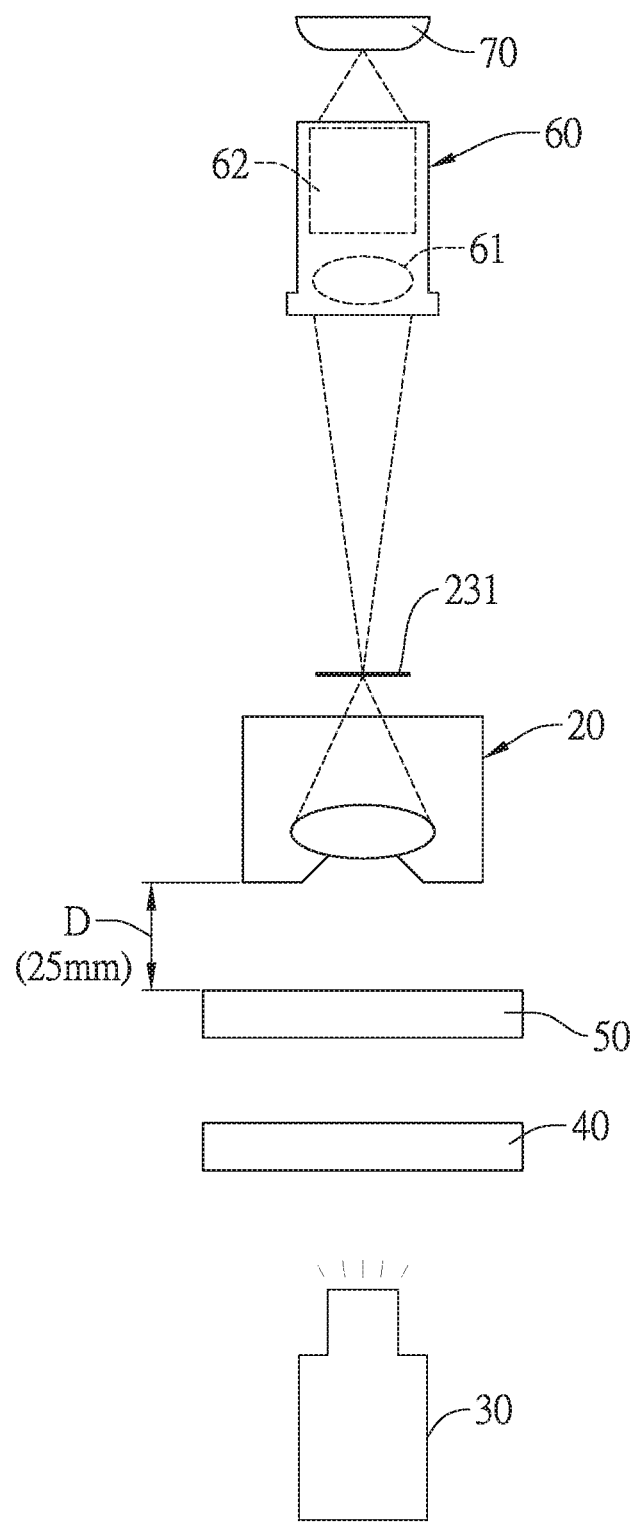
FIG. 3 is a schematic view of the second embodiment of the present disclosure.

Referring to FIG. 3, a micro-distance lens detection device provided in the second embodiment of the present disclosure is also adapted to detect the tested lens 20 from the micro distance D. Likewise, the micro-distance lens detection device comprises the light source module 30, diffuser 40, pattern test card 50, collimator unit 60 and image pickup module 70. The second embodiment is distinguished from the first embodiment by a technical feature described below.

In the second embodiment, the focal plane 231 is outside the lens barrel 22. Hence, the MTF of the tested lens 20 can be measured regardless of whether the focal plane 231 is inside or outside the lens barrel 22.

In a variant embodiment (see FIG. 2), the micro-distance lens detection device comprises the light source module 30, a filter 80, the pattern test card 50, the collimator unit 60 and the image pickup module 70. Hence, the variant embodiment uses the filter 80 instead of the diffuser 40. The variant embodiment is distinguished from the first embodiment by technical features described below.

The filter 80 is disposed above the light source module 30 and at a path of the light beam provided by the light source module 30 to filter out specific wavelength components of the light beam. The collimator unit 60 varies with the filter 80, especially the image pickup lens 61.

The pattern test card 50 is disposed above the filter 80 and at a path of the light beam filtered and has a light-emitting side 51. The pattern test card 50 generates a test pattern light form required for the tested lens 20 according to the light beam.

What is claimed is:

1. A micro-distance lens detection device, adapted to detect a tested lens with a surface from a micro distance, the micro-distance lens detection device comprising
    a light source module for providing a light beam;
    a diffuser disposed at a path of the light beam to homogenize the light beam passing;
    a pattern test card disposed at a path of the light beam homogenized, wherein the pattern test card has a light-emitting side and generates a test pattern light form required for the tested lens according to the light beam;
    an image pickup module; and
    a collimator unit including an image pickup lens and a collimator, wherein the image pickup lens serves to receive the test pattern light form having passed through the tested lens, the collimator serves to receive the test pattern light form having passed through the image pickup lens and focus the test pattern light form on the image pickup module, the collimator further simulates an infinite distance between the tested lens and the image pickup module,
    wherein the tested lens is disposed between the pattern test card and the collimator unit, and the surface of the tested lens is separated from the light-emitting side of the pattern test card by the micro distance, the surface facing the light-emitting side, the micro distance being less than 25 mm.

2. The micro-distance lens detection device of claim 1, wherein the tested lens has a lens barrel and a lens assembly disposed in the lens barrel, the lens assembly generating a focal plane, the focal plane being inside the lens barrel or outside the lens barrel.

3. The micro-distance lens detection device of claim 1, wherein the micro distance is less than 10 mm.

4. The micro-distance lens detection device of claim 1, wherein a test pattern form of the pattern test card is a bar chart, an edge chart or a slit chart.

5. A micro-distance lens detection device, adapted to detect a tested lens with a surface from a micro distance, the micro-distance lens detection device comprising:
    a light source module for providing a light beam;
    a filter disposed at a path of the light beam to filter out specific wavelength components of the light beam;
    a pattern test card disposed at a path of the light beam filtered, wherein the pattern test card has a light-emitting side and generates a test pattern light form required for the tested lens according to the light beam;
    an image pickup module; and
    a collimator unit including a collimator and an image pickup lens, wherein the image pickup lens serves to receive the test pattern light form having passed through the tested lens, the collimator serves to receive the test pattern light form having passed through the image pickup lens and focus the test pattern light form on the image pickup module, the collimator further simulates an infinite distance between the tested lens and the image pickup module,
    wherein the tested lens is disposed between the pattern test card and the collimator, and the surface of the tested lens is separated from the light-emitting side of the pattern test card by the micro distance, the surface facing the light-emitting side, the micro distance being less than 25 mm.

6. The micro-distance lens detection device of claim 5, wherein the tested lens has a lens barrel and a lens assembly disposed in the lens barrel, the lens assembly generating a focal plane, and the focal plane being inside the lens barrel or outside the lens barrel.

7. The micro-distance lens detection device of claim 5, wherein the micro distance is less than 10 mm.

8. The micro-distance lens detection device of claim 5, wherein a test pattern form of the pattern test card is a bar chart, an edge chart or a slit chart.

\* \* \* \* \*